US011822999B2

United States Patent
Reuber et al.

(10) Patent No.: US 11,822,999 B2
(45) Date of Patent: Nov. 21, 2023

(54) CONTROLLED ZONE TRACKING SYSTEM

(71) Applicant: Stephen Gould Corporation, Whippany, NJ (US)

(72) Inventors: Michael Anthony Reuber, Lake Charles, LA (US); Valerie Hawkins, Lake Charles, LA (US); Ryan Carlton Ledford, Sulphur, LA (US)

(73) Assignee: Stephen Gould Corporation, Whippany, NJ (US)

( * ) Notice: Subject to any disclaimer, the term of this patent is extended or adjusted under 35 U.S.C. 154(b) by 69 days.

(21) Appl. No.: 17/505,824

(22) Filed: Oct. 20, 2021

(65) Prior Publication Data

US 2022/0121832 A1    Apr. 21, 2022

Related U.S. Application Data

(60) Provisional application No. 63/094,039, filed on Oct. 20, 2020.

(51) Int. Cl.
| | | |
|---|---|---|
| *G06K 7/10* | (2006.01) | |
| *G07C 9/00* | (2020.01) | |
| *G07C 9/29* | (2020.01) | |
| *G07C 9/28* | (2020.01) | |

(52) U.S. Cl.
CPC ..... *G06K 7/10425* (2013.01); *G06K 7/10138* (2013.01); *G07C 9/00658* (2013.01); *G07C 9/28* (2020.01); *G07C 9/29* (2020.01)

(58) Field of Classification Search
None
See application file for complete search history.

(56) References Cited

U.S. PATENT DOCUMENTS

| | | | | |
|---|---|---|---|---|
| 7,323,991 | B1 * | 1/2008 | Eckert | G07C 9/28 |
| | | | | 235/382 |
| 9,195,866 | B1 * | 11/2015 | Mehranfar | G06Q 10/06 |
| 10,949,629 | B2 * | 3/2021 | Reuber | G06K 7/10099 |
| 2006/0055552 | A1 | 3/2006 | Chung et al. | |
| 2007/0282482 | A1 | 12/2007 | Beucher et al. | |
| 2010/0060455 | A1 | 3/2010 | Frabasile | |
| 2010/0073188 | A1 | 3/2010 | Mickle et al. | |

(Continued)

FOREIGN PATENT DOCUMENTS

| | | |
|---|---|---|
| KR | 10-2008-0018065 A | 2/2008 |
| KR | 10-2009-0000108 A | 1/2009 |

(Continued)

OTHER PUBLICATIONS

The International Bureau of WIPO, International Preliminary Report on Patentability for International Application No. PCT/US2018/016836, dated Sep. 12, 2019.

(Continued)

*Primary Examiner* — K. Wong

(74) *Attorney, Agent, or Firm* — Faegre Drinker Biddle & Reath LLP

(57) ABSTRACT

A controlled zone monitoring system and method for tracking assets is disclosed. The system includes one or more checkpoint stations located adjacent to a controlled zone. Each checkpoint station includes an RFID tag reader for reading RFID tags on assets and a processing system for comparing sets of assets and determining if any assets are missing from the sets.

16 Claims, 5 Drawing Sheets

(56) References Cited

U.S. PATENT DOCUMENTS

2013/0093591 A1    4/2013   Campero et al.
2018/0068542 A1    3/2018   Mondal et al.

FOREIGN PATENT DOCUMENTS

KR    10-2011-0054623 A    5/2011
WO       2007/109241 A2    9/2007

OTHER PUBLICATIONS

European Patent Office, Extended European Search Report for European Patent Application No. 18761377.3, dated Nov. 12, 2020.
International Search Report and the Written Opinion for corresponding International Application PCT/US22/46300, dated Feb. 7, 2023, 11 pages.

\* cited by examiner

CONTROLLED ZONE TRACKING SYSTEM

RELATED APPLICATION

This application is related to and claims priority from U.S. Provisional Application No. 63/094,039, filed Oct. 20, 2020, the disclosure of which is incorporated herein by reference in its entirety.

FIELD OF THE DISCLOSURE

The present disclosure relates generally to location tracking technology and, more particularly, to a system for tracking the location of objects entering and leaving an defined zone.

BACKGROUND

Active identification tags are known to provide real-time tracking capability, but Active identification tags need a power source, and thus, are often too large for practically tagging a number of assets. Recently, a system was developed that combines the advantages of active and passive identification tag systems by permitting real-time tracking with passive identification tags. US Patent Publication No. 20190377913 discloses a system for utilizing an antenna array to track movement of an active identification tag in a monitored location and associate passive identification tags to the active identification tag for purposes of monitoring items being tracked. US Patent Publication No. 20190377913 is incorporated herein by reference in its entirety.

While the system disclosed in the above application provides a significant improvement in tracking and associating objects with particular individuals or locations, there is stile need for improved technology for tracking and monitoring objects.

SUMMARY OF THE INVENTION

According to one aspect of the present application there is provided a controlled zone monitoring system for tracking assets. The system includes one or more checkpoint stations located adjacent to a controlled zone. The checkpoint station includes a support surface; a radio frequency identification (RFID) tag reader mounted below or adjacent to the support surface, the RFID tag reader including an antenna for remote communication, the RFID tag reader configured to, when activated, transmit localized electromagnetic energy for retrieving information from RFID tags in the vicinity of the RFID tag reader; and a processing system including at least one processor, at least one memory, an input component that processes or receives a user action and sends a corresponding signal to the at least one processor, and an output display that displays information from the at least one processor.

The at least one processor is connected to the RFID tag reader to receive sets of signals from the RFID tag reader indicative of information retrieved by the RFID tag reader from RFID tags in the vicinity of the support surface. The at least one processor is programmed to execute computer readable instructions stored in the memory. More specifically, the processor is programmed to:

(i). correlate a first set of the received signals from the RFID tag reader with particular assets being tracked and to output onto the display a first set of assets associated with the first set of received signals, (ii). associate the first set of assets with the particular controlled zone and a first time, (iii). store information related to the first set of assets and the first time in the at least one memory, (iv). correlate a second set of the received signals from the RFID tag reader with particular assets being tracked and to output onto the display a second set of assets associated with the second set of received signals, (v). associate the second set of assets with the particular controlled zone a second time, (vi). compare the first set of assets to the second set of assets to determine if any assets are missing; and (vii). output to the display information regarding the comparison.

The assets are preferably tools.

In one embodiment, the RFID tag reader is mounted below the support surface and at least a portion of the support surface is made from material that permits passage of radio frequency emissions so that the RFID tag reader can read RFID tags.

In another embodiment, the RFID tag reader is embedded into the support surface.

The processing system preferably includes a data bus for communicating data, signals, and other information between various components of the processing system.

The connection between the at least one processor and the RFID tag reader is preferably at least one of a wired connection or a wireless connection.

The processing system may include a transceiver or network interface for transmitting and receiving signals between the processing system and a remote monitoring system.

Either or both of the processing system and the remote monitoring system includes data on locations of each tracked asset with respect to the controlled zone.

The processing system may be activated when either an item is placed on or near the support surface, or a user activates the system.

Passive identification tags are preferably attached to or embedded in a plurality of assets, the passive identification tags each including an integrated circuit/memory component, an antenna, and information stored in the memory component identifying the passive identification tag or an asset on which passive identification tag is attached or in which it is embedded. The antenna is adapted to transmit a signal regarding the information stored in the memory.

The checkpoint system may include an ID card reader connected to the processing system. The ID card reader configured to receive information from ID cards and transmit the information to the at least one processor.

A method of tracking assets entering and leaving a controlled zone is also disclosed. The method includes the steps of:

(i). providing a support surface and an RFID tag reader located proximate to the support surface;

(ii). detecting one or more assets placed on the support surface, each asset including a passive RFID tag containing tag information related to the RFID tag or the asset;

(iii). activating the RFID tag reader to read the tag information from each RFID tag;

(iv). transmitting a first set of tag information from the RFID tag reader to a processing system, the processing system including at least one processor, at least one memory, an input component that processes or receives a user action and sends a corresponding signal to the at least one processor, and an output display that displays information from the at least one processor;

(v). correlating the first set of tag information with particular assets and outputting onto the display a first set of one or more assets associated with the first set of tag information;

(vi). associating the first set of one or more assets with the particular controlled zone and a first time, (vii). storing information related to the first set of one or more assets and the time in the at least one memory, (viii). at a second time, detecting one or more assets placed on the support surface, each asset including a passive RFID tag containing tag information related to the RFID tag or the asset;

(ix). activating the RFID tag reader to read the tag information from each RFID tag;

(x). transmitting a second set of tag information from the RFID tag reader to the processing system;

(xi). correlating the second set of tag information with particular assets and outputting onto the display a second set of one or more assets associated with the second set of tag information;

(xii). associating the second set of one or more assets with the particular controlled zone a second time;

(xiii). comparing the first set of one or more assets to the second set of one or more assets to determine if any assets are missing; and (xiv). outputting to the display information regarding the comparison.

The method may also include the step of confirming the assets included in the first set of one or more assets. The confirmation is provided by a user input into the input component or a comparison to stored data of assets associated with a particular user.

The method may also include the step of the processing system communicating with a central monitoring system for confirming the accuracy of the assets associated with a particular user.

The method may include the additional step of providing an ID card reader connected to the processing system, and reading an ID card and transmitting information to the at least one processor on a user associated with the ID card.

The method preferably includes the step of communicating with a central monitoring system when a comparison indicates an asset is missing from the second set of one or more assets.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWING

For the purpose of illustrating the invention, the drawings show a form of the invention which is presently preferred. However, it should be understood that this invention is not limited to the precise arrangements and instrumentalities shown in the drawings.

DESCRIPTION OF THE INVENTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Embodiments described below generally related to a novel process of tracking passive identification tags in a controlled zone, utilizing a remote or mobile kiosk docking station.

Figure 1:
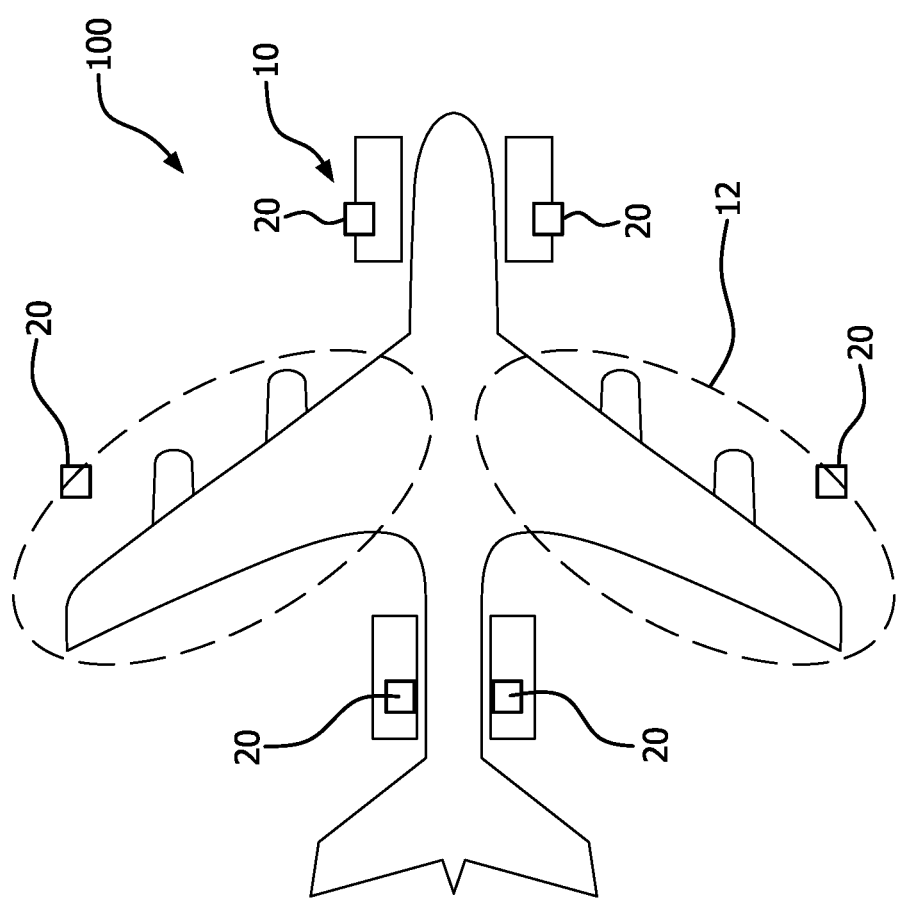
FIG. 1 is a schematic representation of controlled zone tracking systems according to the present invention in use on an aircraft.
Figure 2:
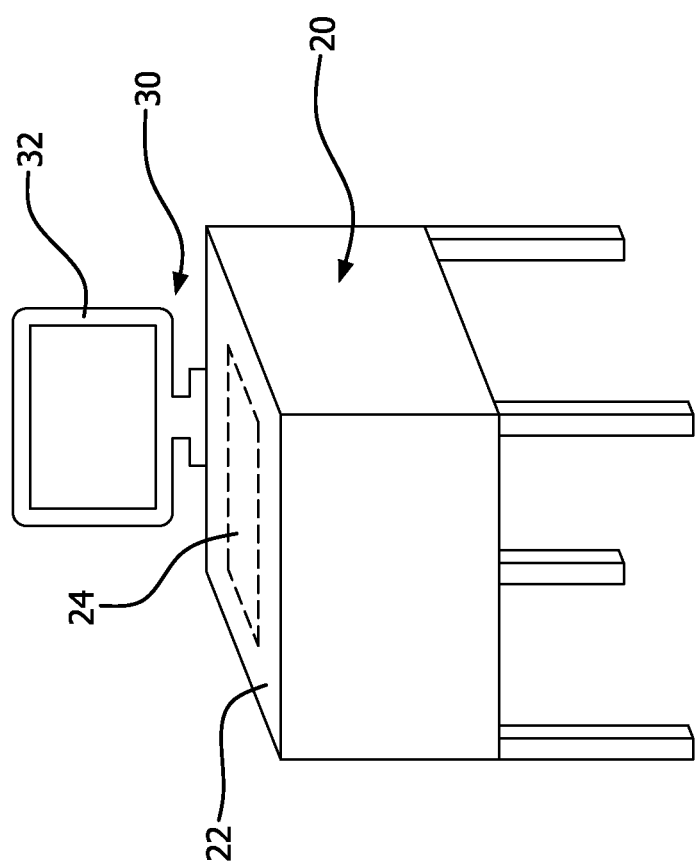
FIG. 2, depicts an embodiment of a kiosk checkpoint station for use near a controlled zone.
Figure 3:
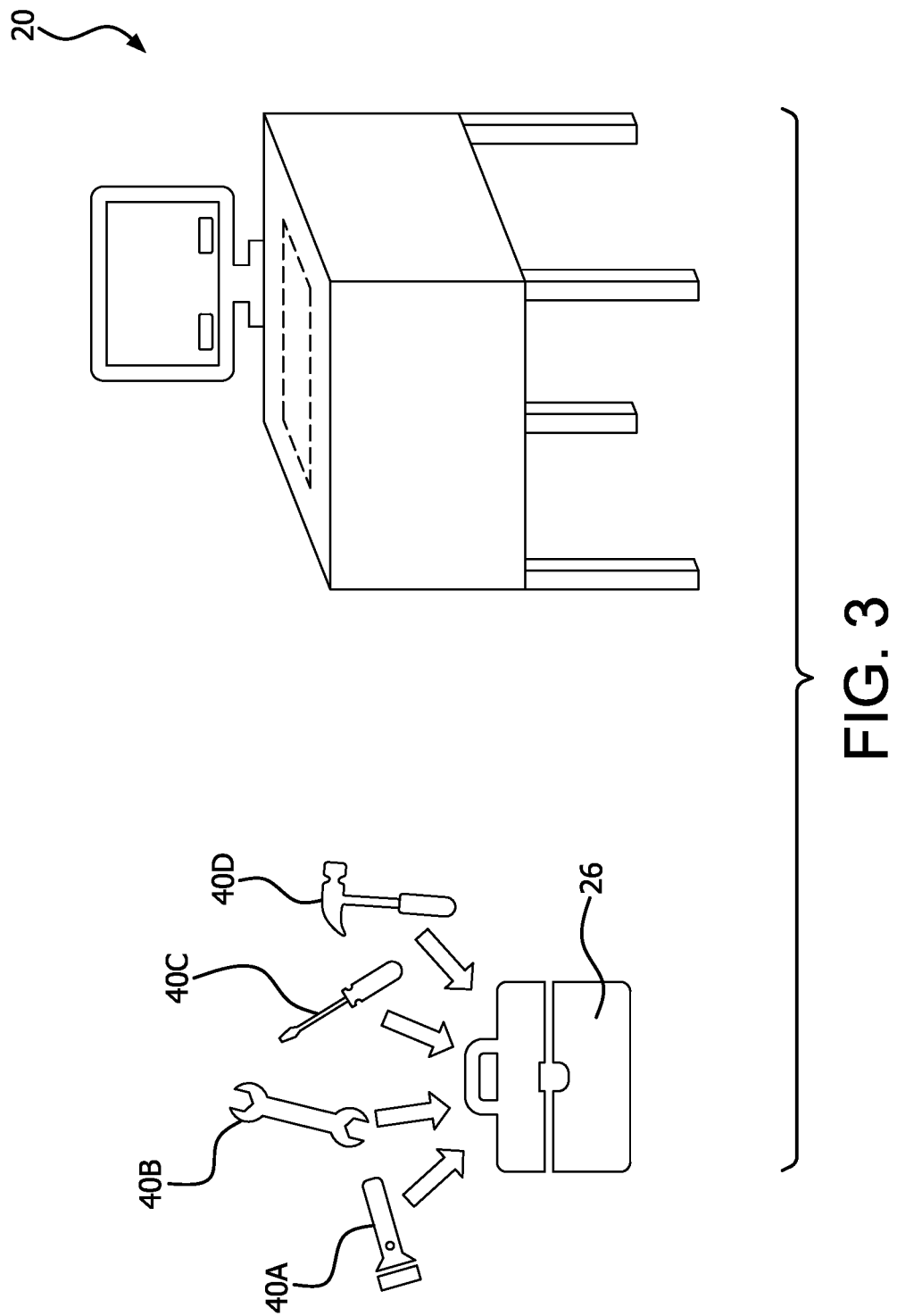
FIG. 3 illustrates a tool case or bag with multiple tagged tools adjacent to the checkpoint station.
Figure 4:
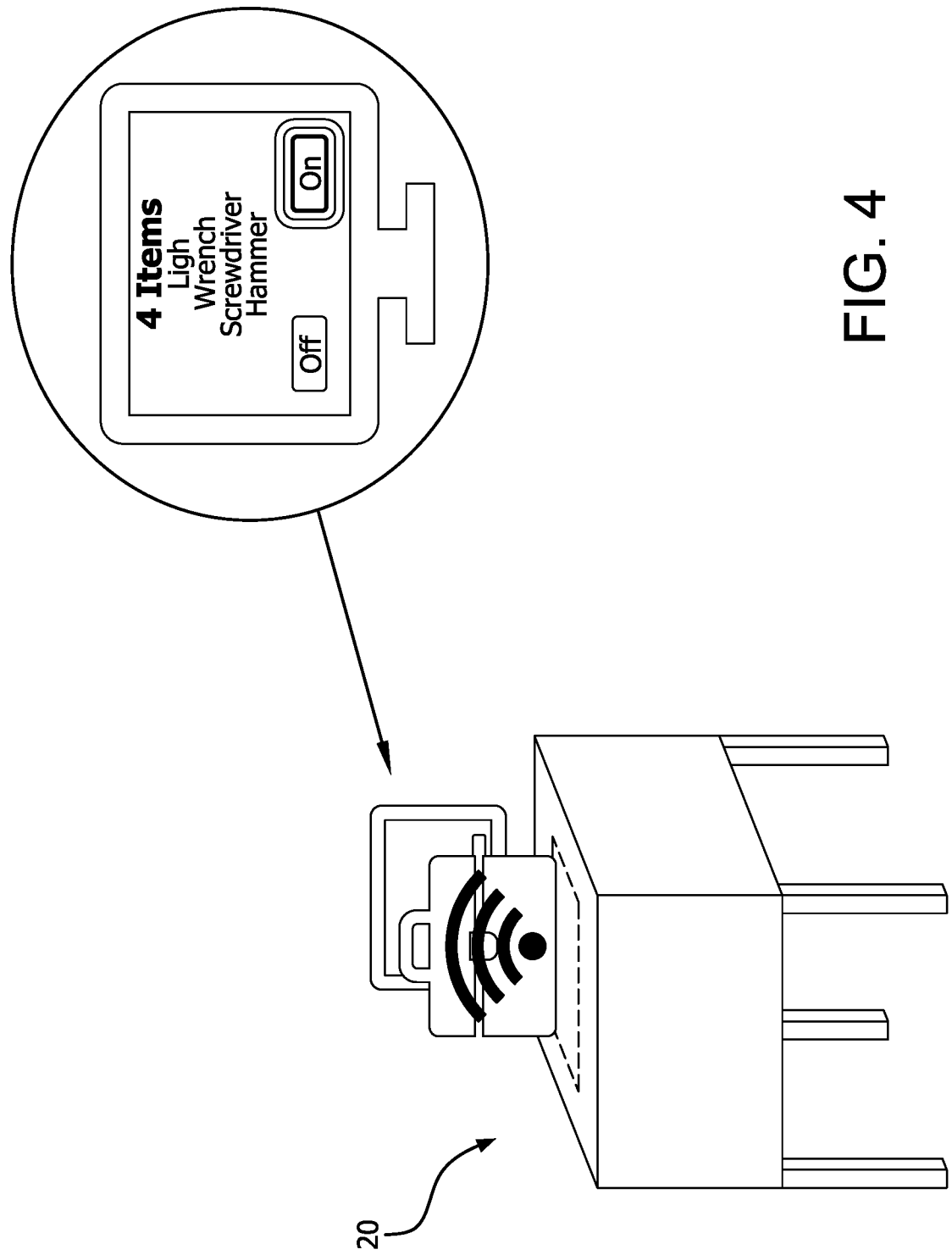
FIG. 4 illustrates the tool bag on the checkpoint station and an enlargement of a monitor depicting the items detected in the bag.
Figure 5:
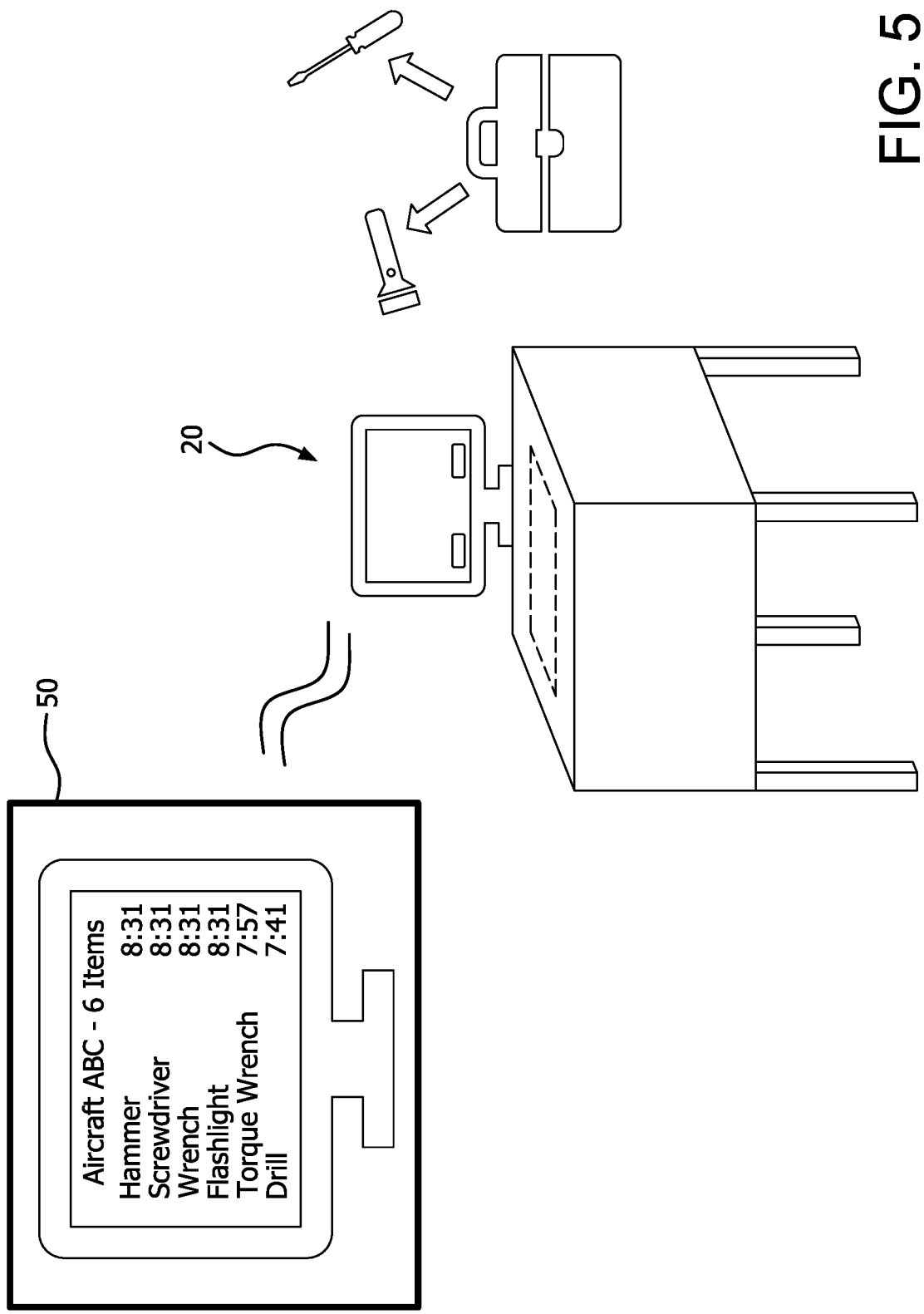
FIG. 5 illustrates the tool bag with items removed and an enlargement of the monitor at the checkpoint station depicting when items were checked into the controlled zone.

FIGS. 1-5 are schematic depictions of one embodiment 100 of a controlled zone monitoring system 10 configured for tracking aircraft maintenance and repair tools or other aircraft maintenance or repair assets in one or more controlled zones 12 in an airport hangar. While FIG. 1 depicts and the following description discusses the use of one or more controlled zones adjacent an aircraft, it should be readily apparent that the present invention can be used for tracking assets in a controlled environment for any type of situation. Referring to FIG. 2, the system 10 includes one or more kiosk checkpoint stations 20 located adjacent to each controlled zone 12. The checkpoint stations 20 include a support surface 22, such as a table or cart top, upon which a tool bag or tool carrying case 26 can be placed. A Radio Frequency Identification ("RFID") tag reader 24 is mounted below or adjacent to the support surface 22. If the RFID tag reader 24 is mounted below the support surface 22, then at least a portion of the support surface 22 is made from material that permits passage of radio frequency emissions so that the RFID tag reader 24 can read RFID tags in the tool bag 26. It is also contemplated that the RFID tag reader could be embedded into the support surface such that the tool bag 26 can rest directly on the RFID tag reader 24. The RFID tag reader 24 may include an antenna directly with the reader for remote communication or could have its antenna spaced apart from the reader itself. One preferred RFID tag reader is the Speedway® RAIN RFID Reader sold by Impinj, Inc.

The checkpoint station 20 also includes a computing or processing system 30 for implementing one or more embodiments of the present disclosure. In its most basic configuration, the computing system 30 may include at least one processor and at least one memory. The computing system 30 also preferably includes a bus (not shown) or other communication mechanism for communicating data, signals, and other information between various components of computer system 30. Components may include an input component that processes a user action, such as selecting keys from a keypad/keyboard or touchscreen, selecting one or more buttons or links, etc., and sends a corresponding signal to the at least one processor. One of the components included in the computing system is an output component 32, such as a display, that may display, for example, results of operations performed by the at least one processor or transmitted from the RFID reader.

The checkpoint station 20 preferably includes a power source, such as 120V power supply or battery power supply for providing a power source to the RFID tag reader 24 and the computing system 30. It is also contemplated that a Power over Ethernet (PoE) network connection may be provided to supply the necessary power as would be understood to a person skilled in the art.

The checkpoint computing system 30 communicates with the RFID tag reader 24. More specifically, the computing system 30 receives signals and/or data from the RFID tag reader 24 indicative of information read from RFID tags on items placed on the support surface 22 as will be discussed in more detail below. The communication between the commuting system 30 and the RFID tag reader 24 could be through a wired connection or a wireless connection, such as WiFi or Bluetooth.

The checkpoint computing system 30 preferably includes a transceiver or network interface for transmitting and receiving signals between the checkpoint computer system 30 and other devices, such as a central monitoring system 50, located remotely from the checkpoint computing system 30. In one embodiment, the transmission is wireless, although other transmission mediums and methods may also be suitable, for example the computing system may be hardwired to central processor, such as through an Ethernet connection.

The at least one processor, which can be a micro-controller, digital signal processor (DSP), or other processing component, processes these various signals, such as for display on computer system 30 or transmission to other devices via a communication link. The at least one processor may also control transmission of information, such as cookies or IP addresses, to other devices. The at least one processor may execute computer readable instructions stored in the memory. The computer readable instructions, when executed by the at least one processor, may cause the at least one processor to implement processes associated with any of the process steps discussed below.

Computer system 30 may perform specific operations using the processor and other components by executing one or more sequences of instructions contained in a system memory component. Logic may be encoded in a computer readable medium, which may refer to any medium that participates in providing instructions to the at least one processor for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

As discussed above, the present invention provides a system for tracking a plurality of tracked assets 40, such as various tools, or other items, that each have a passive RFID tag applied to the tracked asset 40. The system contemplates that the checkpoint computing system 30 or the central monitoring system 50 includes data on the location of each tracked asset 40 with respect to the controlled zone 12 as will become more apparent from the following discussion.

During use of the system 10, the checkpoint computing system 30 initially is either in a passive state (e.g., the computing system 30 is in a sleep mode waiting to receive a signal in order to begin functioning) or is inactive (waiting to be activated by a user). A user approaches one of the checkpoint stations 20 for a controlled zone 12 of interest. The user places one or more of the tracked assets 40 on the support surface 22. If the computing system is operating in a passive state (i.e., it is on and waiting for a signal), the placement of the asset 40 on the surface 22 generates the signal to cause the computing system 30 to begin operating. For example, the support surface may include a pressure sensor that detects placement of the asset 40 on the surface. Alternately, an optical sensor, such as a light sensor, may be located on or proximate to the surface 22 which detects that an asset is placed on the surface 22. Other forms of automated signal generators may be used. If the computing system requires user activation, then the computing system 30 may include a physical on/off switch or an on/off icon on the touchscreen display 26 that the user activates to cause the computing system 30 to begin operation.

When the computing system 30 is operating it activates the RFID tag reader 24. The RFID tag reader 24 includes an antenna which transmits localized electromagnetic energy (e.g., radio frequency signals) for detecting RFID tags in the vicinity of the RFID tag reader 24. More particularly, passive identification tags (RFID tags) are attached to or embedded in tracked assets. The passive identification tag includes an integrated circuit/memory component and an antenna. The integrated circuit/memory component may store information such as, for example, information uniquely identifying the passive identification tag and/or information (e.g., EPC) uniquely identifying the asset or item to which passive identification tag is attached or in which it is embedded. The passive identification tag typically does not include an internal power source. When the RFID tag reader 24 is activated its antenna sends the electromagnetic energy which "interrogates" the passive identification tag, i.e., energizes the passive identification tag. Once energized, passive identification tag transmits, via its antenna, a signal that identifies the passive identification tag so that the RFID tag reader 24 detects presence of passive RFID tag.

Once the RFID tag reader 24 detects the passive RDIF tag, it transmits this information to the processor of the computing system 30 and stores information regarding the asset 40, such as a description of the asset (either received from the passive identification tag or from a database based on the identity of the passive identification tag), the current time/date that the asset was identified by the RFID tag reader 24 (i.e., the time the asset was checked-in at the checkpoint station 20), the identification of the checkpoint station (i.e., which particular checkpoint station), and any other particular information relevant to the asset (such as the owner of the asset, or the user that the asset is currently assigned to.) It is contemplated that the checkpoint station might check in the user, such as through a login, reading a RFID tag on the user's bag or having the user swipe or scan an ID card with identifying information contained or stored on the card. A magnetic strip or bar code card reader could be included in the checkpoint station to facilitate the scanning of an ID card.

The checkpoint computing system preferably depicts on the display information regarding the asset or assets currently on the RFID tag reader 24. The user can then verify the information on the screen. The computing system 30 may include a prompt for the user to confirm the accuracy of the information. Alternatively, the computing system 30, may include stored data of assets associated with the particular user and may conduct a local audit of the assets on the RFID reader 24 and identify on the screen any missing assets. In another embodiment, it is contemplated that the checkpoint computing system 30 may communicate with the central monitoring system 50 for confirming the accuracy of the number and type of assets associated with the particular user. The central monitoring system 50 may send a signal to a third party or to the user to investigate any discrepancy between the data stored on the central monitoring system 50 regarding the number and type of assets associated with the user and the number and type of assets 40 detected by the RFID tag reader 24 at the checkpoint station 20.

The computing system 30 may provide the ability of the user to add, remove, or edit tracked items on the display screen, and stores those changes in memory to keep a record of any changes.

The system 10 permits the ability to track assets 40 as they are brought into and out of a controlled zone 12. The system contemplates that a user will check-in at a checkpoint station 20 when the user is first entering a controlled zone 12 and then check-out at a checkpoint station 20 (either the same checkpoint station or a different, but networked checkpoint station 20 at the same controlled zone) when the user is exiting the controlled zone 12. The system tracks which and how many assets 40 are brought into and leave the controlled zone, thus permitting monitoring and tracking of assets in a controlled zone.

The scope of the invention will become more apparent with the following discussion of a particular embodiment for use in tracking assets related to an aircraft undergoing maintenance. Referring to FIG. 1, various controlled zones 12 are associated with the various areas where maintenance or repairs are to be carried out (for example, a zone associated with maintenance to an aircraft wing or engine, a zone associated with the interior of the aircraft). One or more checkpoint stations 20 are associated with each controlled zone 12 (for example, for a controlled zone that comprises the interior of the aircraft, a checkpoint station 20 may be located at each access point into the aircraft interior.)

When a mechanic or service personnel arrive at the controlled zone 12, they check-in at the checkpoint station 20 by placing their toolbag 26 on the support surface 22. The toolbag 26 contains various tools 40 each including an RFID tag. In the illustrated embodiment, the toolbag includes a flashlight 40A, a wrench 40B, a screwdriver 40C and a hammer 40D. The computing system 30 is activated as discussed above and the RFID tag reader reads the tools contained in the toolbag 26. The RFID tag reader 24 sends information to the processor of the items it detects in the toolbag 26. A list of the detected items is displayed on the display 26. The mechanic confirms the items and confirms that they are taking the items into the controlled zone 12, such as by pressing a key or a touchscreen icon that they are checking into the zone. The computing system 30 stores the information in its memory regarding the number and type of tools that the mechanic has brought into the zone.

Once the mechanic has finished working on or in the aircraft, the mechanic goes to a checkpoint station 20 (either the same checkpoint station or a networked checkpoint station) and again places the toolbag 26 onto the support surface 22. The RFID tag reader is activated as discussed above, and reads the RFID tags in the toolbag 26. The mechanic confirms the items and indicates to the system that the tools are being removed from the controlled zone 12, such as by pressing a key on a keyboard or a touchscreen icon. The computing system 30 stores the information in its memory regarding the number and type of tools that the mechanic has taken out of the zone. Optionally, the computing system 30 compares information on the currently detected tools against the stored information regarding the number and type of tools that the mechanic had previously checked into the zone. If there is a match between the current tools and the prior tools, the display screen 26 confirms that all the tools are present and permits the mechanic to check-out of the zone by pressing a key or an icon on the touchscreen display 26.

In one optional embodiment, if the computing system does not detect that all the tools are present in the toolbag 26 (i.e., there is a mismatch between the currently detected RFID tags and the RFID tags previously detected when the mechanic initially checked into the zone) the system displays the issue on the display 26 and notifies the mechanic of the tools that are missing from the toolbag 26. The mechanic can then go back to the zone to look for the missing tool.

The mechanic may also optionally search the toolbag 26 for the missing tool. If the missing tool is in the toolbag but was not detected, it may be because there was interference preventing reading of the RFID tag, or the RFID tag is faulty or the RFID tag reader 24 is defective. If the tool is in the bag, the mechanic can move it so that the reader 24 can detect it and log it in.

Optionally, if the computing system 30 is networked to the central monitoring system 50 as discussed above, when the system determines that a tool is missing (or not detected) when a mechanic is attempting to check out of a zone, the computing system (or the mechanic through the computing system 30) preferably notifies the central monitoring system 50 of the issue. System personnel can then contact the mechanic regarding the issue related to the missing tool. If it is a faulty RFID tag or reader, the system personnel can go to the mechanic to fix the RFID tag or the RFID tag reader and then check-out the mechanic. It is also contemplated that the present invention can work independently of the assignment of a tool to a mechanic. Thus, it is contemplated that unassigned item can still be checked into and out of a zone. The present invention can also be used in conjunction with an active identification tag system, such as the system described in U.S. application Ser. No. 16/477,397 titled "Real-Time Tracking Of Passive Identification Tags", assigned to the assignee of the present invention, which is incorporated herein by reference in its entirety.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 30. In various other embodiments of the present disclosure, a plurality of computer systems 30 may be coupled by communication link to the network (e.g., such as a LAN, WLAN, PTSN, and/or various other wired or wireless networks, including telecommunications, mobile, and cellular phone networks) may perform instruction sequences to practice the present disclosure in coordination with one another.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. For example, a specific example of hand tools are given, but the invention may be used for tracking of any asset tagged with a passive RFID tag in a supply chain or asset management system. Other structures, configurations, and implementations consistent with the scope of the claimed invention will be apparent to those skilled in the art from a consideration of the specification or practice of the invention disclosed herein.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations of a monitoring system have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

No language in the specification should be construed as indicating any non-claimed element as essential to the practice of the invention.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

The invention claimed is:

1. A controlled zone monitoring system for tracking assets in a geographically defined controlled zone which encompasses a local area of interest within which automatic active tracking of assets is not occurring, the system comprising one or more kiosk checkpoint stations located adjacent to the controlled zone for permitting monitoring of assets entering and leaving the controlled zone, the kiosk checkpoint station comprising:

a support surface;

a radio frequency identification (RFID) tag reader mounted below or adjacent to the support surface so as to be positioned to read items located on the support surface, the RFID tag reader including an antenna for remote communication, the RFID tag reader configured to, when activated, transmit localized electromagnetic energy for retrieving information from RFID tags in the vicinity of the RFID tag reader;

a processing system including at least one processor, at least one memory, an input component that processes or receives a user action and sends a corresponding signal to the at least one processor, and an output display that displays information from the at least one processor, the at least one processor connected to the RFID tag reader to receive sets of signals from the RFID tag reader indicative of information retrieved by the RFID tag reader from RFID tags in the vicinity of the support surface, the at least one processor programmed to execute computer readable instructions stored in the memory to (i) correlate a first set of the received signals from the RFID tag reader with particular assets being tracked and to output onto the display a first set of assets associated with the first set of received signals, (ii) associate the first set of assets with the particular controlled zone and a first time, (iii) store information related to the first set of assets and the first time in the at least one memory, (iv) correlate a second set of the received signals from the RFID tag reader with particular assets being tracked and to output onto the display a second set of assets associated with the second set of received signals, (v) associate the second set of assets with the particular controlled zone a second time, (vi) compare the first set of assets to the second set of assets to determine if any assets are missing; and (vii) output to the display information regarding the comparison including identifying on the display the user and the particular controlled zone where a missing asset may be located.

2. The controlled zone monitoring system of claim 1, wherein the assets are tools.

3. The controlled zone monitoring system of claim 1, wherein at least a portion of the support surface is made from material that permits passage of radio frequency emissions so that the RFID tag reader can read RFID tags.

4. The controlled zone monitoring system of claim 1, wherein the RFID tag reader is embedded into the support surface.

5. The controlled zone monitoring system of claim 1, wherein the processing system includes a data bus for communicating data, signals, and other information between various components of the processing system.

6. The controlled zone monitoring system of claim 1, wherein the connection between the at least one processor and the RFID tag reader is at least one selected from a group consisting of a wired connection and a wireless connection.

7. The controlled zone monitoring system of claim 1, further comprising a transceiver or network interface for transmitting and receiving signals between the processing system and a remote monitoring system.

8. The controlled zone monitoring system of claim 7, wherein at least one of the processing system or the remote monitoring system includes data on locations of each tracked asset with respect to the controlled zone.

9. The controlled zone monitoring system of claim 1, wherein the processing system is activated when one of either an item is placed on or near the support surface, or a user activates the system.

10. The controlled zone monitoring system of claim 1, wherein passive identification tags are attached to or embedded in a plurality of assets, the passive identification tags each including an integrated circuit/memory component and an antenna, and information stored in the memory component identifying the passive identification tag or an asset on which passive identification tag is attached or in which it is embedded, the antenna adapted to transmit a signal regarding the information stored in the memory.

11. The controlled zone monitoring system of claim 1, wherein the checkpoint system further comprises an ID card reader connected to the processing system, the ID card reader configured to receive information from ID cards and transmit the information to the at least one processor.

12. A method of tracking assets entering and leaving a controlled zone, the method comprising the steps of:
defining a geographic controlled zone which encompasses a local area of interest within which automatic active tracking of assets was not intended to occur;
providing at least one kiosk checkpoint station at a select entry point into the controlled zone for permitting monitoring of assets entering and leaving the controlled zone, the at least one kiosk checkpoint station including a support surface, an RFID tag reader located below or adjacent to the support surface so as to be positioned to read items located on the support surface, a processing system for determining assets placed on the support surface, the processing system including at least one processor, at least one memory, an input component that processes or receives a user action and sends a corresponding signal to the at least one processor, and an output display that displays information from the at least one processor;
detecting one or more assets placed on the support surface, each asset including a passive RFID tag containing tag information related to the RFID tag or the asset;
activating the RFID tag reader to read the tag information from each RFID tag;
transmitting a first set of tag information from the RFID tag reader to the processing system;
correlating the first set of tag information with particular assets and outputting onto the display a first set of one or more assets associated with the first set of tag information;
associating the first set of one or more assets with the particular controlled zone, a particular individual, and a first time,
storing information related to the first set of one or more assets and the time in the at least one memory,
at a second time that is later than the first time, detecting one or more assets placed on the support surface, each asset including a passive RFID tag containing tag information related to the RFID tag or the asset;
activating the RFID tag reader to read the tag information from each RFID tag;
transmitting a second set of tag information from the RFID tag reader to the processing system;
correlating the second set of tag information with particular assets and outputting onto the display a second set of one or more assets associated with the second set of tag information;
associating the second set of one or more assets with the particular controlled zone and a particular individual at the second time;
comparing the first set of one or more assets to the second set of one or more assets to determine if any assets are missing; and
outputting to the display information regarding the comparison including whether any assets from the first set of one or more assets are not included in the second set of one or more assets and identifying on the display the user and the particular controlled zone where the missing asset may be located.

13. The method of tracking assets according to claim 12, further comprising the step of confirming the assets included in the first set of one or more assets, wherein the confirmation is provided by a user input into the input component or a comparison to stored data of assets associated with a particular user.

14. The method of tracking assets according to claim 13, further comprising the step of the processing system communicating with a central monitoring system for confirming the accuracy of the assets associated with a particular user.

15. The method of tracking assets according to claim 14, further comprising the steps of providing an ID card reader connected to the processing system, and reading an ID card and transmitting information to the at least one processor on a user associated with the ID card.

16. The method of tracking assets according to claim 12, further comprising the step communicating with a central monitoring system when a comparison indicates an asset is missing from the second set of one or more assets.

* * * * *